Patented June 8, 1948

2,443,092

UNITED STATES PATENT OFFICE 2,443,092

3,3 BIS(4-DIMETHYLAMINO 3-METHYL PHENYL) PHTHALIDE

Clyde S. Adams, Yellow Springs, Ohio, assignor to The National Cash Register Company, Dayton, Ohio, a corporation of Maryland No Drawing. Application March 15, 1946, Serial No. 654,800

1 Claim. (Cl. 260—337)

This invention relates to a new composition of matter which is the compound 3,3 bis (4-dimethylamino 3-methyl phenyl) phthalide having the structure

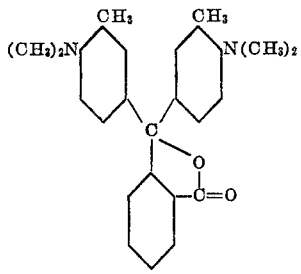

The novel compound is a normally colorless, solid material of crystalline form and has the characteristic of assuming a bluish-green color when in adsorption contact with highly polar solid material, such as clay of the kaolin type. The new compound is useful in finely divided form as a color reactant in coating record material in conjunction with a binder containing kaolin. In such a coating, the kaolin particles and the color reactant particles of the novel compound are normally intermingled but kept from adsorption contact by the binder.

Such coated record material may be marked upon by a stylus given sufficient marking pressure to rupture the binder coating, thus bringing into contact the two different solid intermingled substances at the points where the stylus has been drawn across the record material, resulting in a bluish-green colored mark. Such a record material coating is fully described in applications for United States Letters Patent, Serial Nos. 520,573 and 581,834 (now abandoned), filed by Barrett K. Green on January 31, 1944, and March 9, 1945, respectively.

The novel substance may be prepared by a process including four steps, as follows:

In step I, 68 grams (½ mole) of orthodimethyltoluidine, 37 grams (¼ mole) of phthalic anhydride, and 70 grams of powdered anhydrous zinc chloride (fused at 290 degrees C.) are introduced into a 500 ml. wide-mouthed Erlenmeyer flask, and the flask is then heated in an oil bath at 140 degrees C. for three to four hours.

In step II, the hot condensation mixture resulting from the first step is poured into 750 ml. of a dilute solution of hydrochloric acid containing 75 ml. of 37% concentrated HCl and 675 ml. of water. The resulting clear brown solution is cooled and neutralized with an excess of caustic soda solution. An oily layer separates out.

In step III, the oily layer resulting from step II of the process is separated out and mixed with 800 ml. of water and the mixture made slightly alkaline with caustic soda, and thereafter steam-distilled to remove the excess of ortho-dimethyltoluidine. The steam-distilled mixture is then transferred to a beaker and allowed to cool. The light yellow crystalline solid which separates out is filtered off.

In step IV of the process, the yellow crystalline product from the previous operation is recrystallized from its solution in hot ethyl alcohol. The white crystals are filtered off, washed with a small amount of cold alcohol, and dried. These crystals constitute the novel product and have a melting point of approximately 189 degrees C.

The novel compound is not to be deemed to be limited to one made by the described process, as other modes of manufacture may be found.

What is claimed is:

3,3 bis (4-dimethylamino 3-methyl phenyl) phthalide having the structure

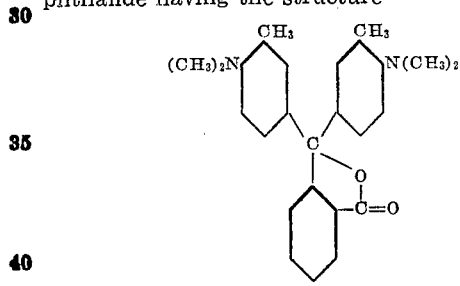

CLYDE S. ADAMS.

REFERENCES CITED

The following references are of record in the file of this patent:

Chemical Abstracts, vol. 32, 2106 (1938).